US011163209B2

(12) United States Patent
LaHaye et al.

(10) Patent No.: US 11,163,209 B2
(45) Date of Patent: Nov. 2, 2021

(54) METAMATERIAL-BOOSTED QUANTUM ELECTROMECHANICAL TRANSDUCER FOR MICROWAVE-OPTICAL INTERFACING

(71) Applicants: Matthew LaHaye, Manlius, NY (US); Britton Plourde, Jamesville, NY (US)

(72) Inventors: Matthew LaHaye, Manlius, NY (US); Britton Plourde, Jamesville, NY (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 16/898,843

(22) Filed: Jun. 11, 2020

(65) Prior Publication Data
US 2020/0393738 A1 Dec. 17, 2020

Related U.S. Application Data

(60) Provisional application No. 62/859,803, filed on Jun. 11, 2019.

(51) Int. Cl.
*G02F 1/35* (2006.01)
*H01P 3/00* (2006.01)

(52) U.S. Cl.
CPC ............... *G02F 1/353* (2013.01); *H01P 3/00* (2013.01)

(58) Field of Classification Search
CPC ............... G02F 1/353; H01P 3/00; H01P 3/08
See application file for complete search history.

(56) References Cited

U.S. PATENT DOCUMENTS

| | | | | |
|---|---|---|---|---|
| 6,859,114 | B2 * | 2/2005 | Eleftheriades | B82Y 20/00 333/116 |
| 8,344,828 | B2 * | 1/2013 | Lee | H01P 3/08 333/238 |
| 9,260,289 | B2 * | 2/2016 | Park | G02B 6/00 |
| 9,423,568 | B2 * | 8/2016 | Combrie | G02B 6/35 |
| 9,885,888 | B2 * | 2/2018 | Bishop | G02F 1/011 |
| 10,657,456 | B1 * | 5/2020 | Kharzeev | H01F 38/14 |
| 10,858,240 | B2 * | 12/2020 | Painter | G06N 10/00 |
| 10,916,821 | B2 * | 2/2021 | Painter | H01P 3/00 |
| 10,955,726 | B2 * | 3/2021 | Orcutt | G02B 6/29335 |

OTHER PUBLICATIONS

Wang et al., "Mode Structure in Superconducting Metamaterial Transmission Line Resonators", Physical Review Applied 11, 054062, May 22, 2019, 20 pages (Year: 2019).*

* cited by examiner

*Primary Examiner* — Daniel Petkovsek
(74) *Attorney, Agent, or Firm* — David L. Nocilly; Bond Schoeneck & King, PLLC

(57) ABSTRACT

A quantum computing transducer having a dense, tunable superconducting metamaterial transmission line (SMTL) spectrum that can resonantly enhance sideband scattering. The resonant enhancement of scattering boosts the scattering rate, and hence also the microwave-to-optical-interface (MOQI) transduction efficiency. Moreover, the integration of mechanical elements with the SMTL to realize the MOQI yields a platform that can be readily interfaced on chip, such as in an integrated circuit, with superconducting-qubit architectures to facilitate the local implementation of two of the essential functionalities required for a quantum repeater, i.e., data egress/ingress and a quantum processing module.

15 Claims, 6 Drawing Sheets

METAMATERIAL-BOOSTED QUANTUM ELECTROMECHANICAL TRANSDUCER FOR MICROWAVE-OPTICAL INTERFACING

CROSS-REFERENCE TO RELATED APPLICATIONS

The present application claims priority to U.S. Provisional Application No. 62/859,803, filed on Jun. 11, 2019.

BACKGROUND OF THE INVENTION

1. Field of the Invention

The present invention to quantum computer transducers and, more specifically, to a transducer formed from superconducting transmission line metamaterial with integrated Josephson-junction circuit elements.

2. Description of the Related Art

The implementation of distributed quantum information networks with modular, cross-quantum processing platforms will likely require the development of transducers that can transfer quantum information with high fidelity between disparate energy scales. For example, one promising architecture would be to utilize processors based on superconducting qubits operating in the microwave regime for fast intra-nodal processing (gate times) and error-correction, while relying upon the optical domain for low-loss transmission of information between nodes and the implementation of optical measurement techniques and devices, such as fast and efficient single-photon detectors, non-linear media for entanglement generation, and the ability to state-swap with trapped ion qubits for memory.

Leading candidates for such transduction between microwave and optical domains include a variety of optomechanical and optoelectronic devices. Optomechanical transduction utilizes a compliant mechanical element to serve as the interface between the two domains. In these systems the mechanical element is integrated with both an optical cavity and a microwave cavity in a manner that provides parametric coupling between motion of the mechanical element and modes in both cavities; the parametric coupling, in turn, leads to anti-Stokes (Stokes) scattering processes which up-convert (down-convert) signal photons. The transduction mechanism is then implemented through cavity pulses that stimulate motional sidebands and drive signal conversion between targeted modes of the cavities.

Thus far, several different configurations using this technique have enabled microwave-to-optical transduction and even bi-directional conversion between microwave and optical regimes. However, due to inefficiency in the sideband conversion process, this technique has only been demonstrated at large cavity photon numbers and is not yet suitable to serve as an interface in the quantum regime.

As a result, coherent microwave-optical quantum interfaces (MOQIs) remain an outstanding challenge to implement. Leading optomechanical techniques involve weak acoustic-electromagnetic interactions that yield low efficiency signal conversion, and require complicated and slow noise-reduction processes to approach useful conversion levels. Similarly, conversion efficiencies are weak (in the few percent range) for electro-optic techniques. Accordingly, there is a need in the field for an approach that provides a viable path to quantum coherent transduction without complicated and slow noise-reduction processing.

BRIEF SUMMARY OF THE INVENTION

The present invention comprises the integration of optomechanical elements with superconducting metamaterial transmission line (SMTL) cavities to provide for quantum coherent transduction. More specifically, the present invention comprises a transducer formed from a metamaterial transmission line that can produce a dense spectrum of modes—mode spacings of 50-500 MHz—in the microwave regime—roughly 5-10 GHz—that has at least two adjacent modes, and a mechanical resonator coupled to the metamaterial transmission line, wherein the two adjacent modes of the metamaterial transmission line are configured to have a frequency spacing that matches a frequency of the mechanical resonator. The mechanical resonator may be parametrically coupled to the metamaterial transmission line so that any mechanical motion of the mechanical resonator will stimulate sidebands on each of the modes of metamaterial transmission line. The application of a microwave pump tone to the lower frequency of the two adjacent modes of the metamaterial transmission line will resonantly enhance the anti-Stokes process with the higher frequency mode to drive conversion of any metamaterial transmission line photons into mechanical resonator phonons. The mechanical resonator may be either a vibrational mode of a suspended nanostructure (e.g., a membrane, doubly-clamped beam, or optomechanical crystal) or it may be a bulk mode mechanical resonator. The metamaterial transmission line may be a tunable metamaterial transmission line. The tunable metamaterial transmission line may comprise a series of unit cells. The unit cells are patterned from thin metal films, such as aluminum or niobium, that become superconducting at the low temperatures at which the device is operated and may comprise a capacitor and a variable inductor. The variable inductor may comprise a shunt dc Superconducting Quantum Interference Device (SQUID) coupled to the capacitor. The resonator may comprise an optomechanical crystal membrane. The optomechanical crystal membrane may comprise a capacitor having a top plate having an upper portion and a bottom portion and a lower plate spaced apart from the bottom portion of the top plate. The upper portion of the top plate of the capacitor may be formed from silicon. The bottom portion of the top plate of the capacitor may be formed from superconducting aluminum. The bottom portion of the top plate is connected to ground. The bottom plate may be formed from superconducting Nb. The bottom plate may be coupled to a cavity formed from a metamaterial transmission line.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1A:
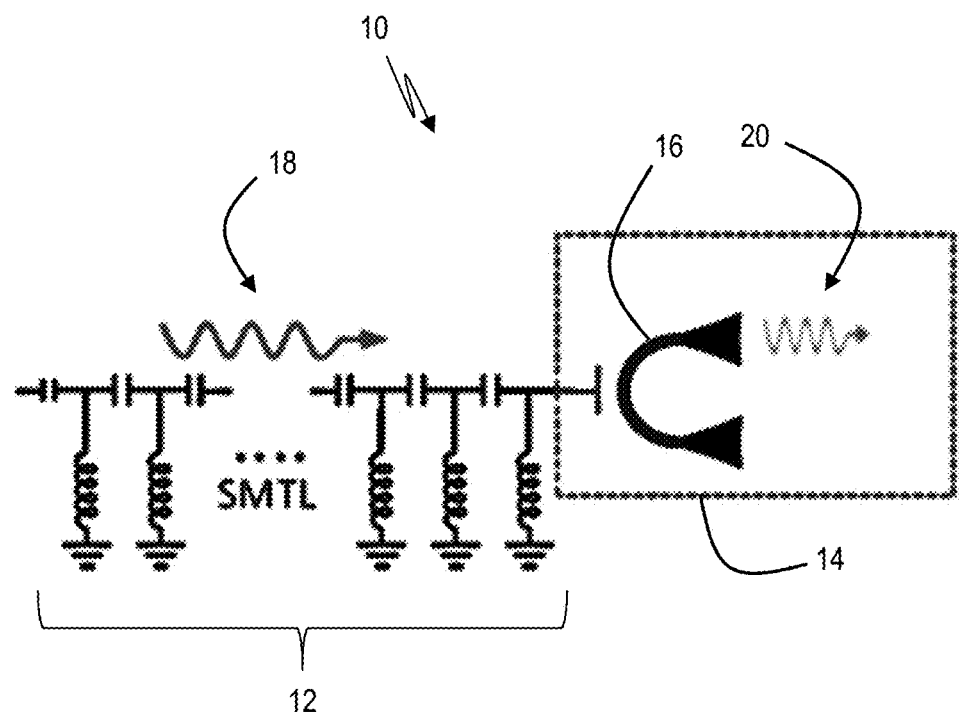
FIG. 1A is a schematic showing a microwave-optical quantum interface (MOQI) according to the present invention.
Figure 1B:
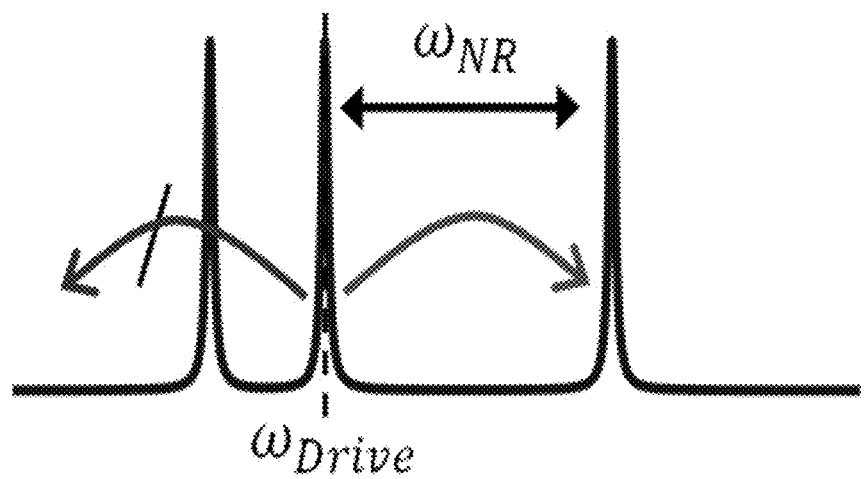
FIG. 1B is a graph of a resonantly-enhanced anti-stokes process.

Referring to the figures, wherein like numeral refer to like parts throughout, there is seen in FIG. 1A, the present invention comprises a transducer system 10 formed from a superconducting metamaterial transmission line (SMTL) 12 that is integrated with photonic circuitry 14 having a nanomechanical device (mechanical resonator) 16 to enhance optomechanical interactions for higher efficiency microwave 18 to optical 20 transduction. SMTL 12 is a planar lattice of reactive components, which are arranged to yield a left-handed dispersion relation that produces a dense spectrum of modes in the microwave regime. The unique mode spectrum of SMTL 12 is harnessed to resonantly enhance the sideband scattering process. Two adjacent SMTL modes are configured to have a frequency spacing that matches the frequency of the nanomechanical element, as seen in FIG. 1B. Upon application of a microwave pump tone, the anti-Stokes process, which drives the conversion of SMTL photons to acoustic phonons, is resonantly enhanced by the presence of the higher frequency mode. The anti-Stokes conversion rate is boosted by a factor of $\omega_{NR}/\gamma$, where $\omega_{NR}$ is the nanomechanical mode frequency and $\gamma$ is the linewidth of the SMTL modes. For typical application, this ratio could provide as much as 1000× conversion enhancement. Because the efficiency of optomechanical transduction is dependent on the strength of the anti-Stokes process, the present invention should translate directly into improving the conversion efficiency, overcoming the limitations of existing techniques, and providing a viable route to quantum coherent optomechanical transduction. SMTL 12 may be patterned from superconducting thin films configured to produce a dense spectrum of modes in the microwave regime (about 5 to 10 GHz) with mode spacings of 50 to 500 MHz.

In an exemplary embodiment, mechanical resonator 16 may be parametrically coupled to SMTL 12 so that mechanical motion of mechanical resonator 16 will stimulate sidebands on each of the closely-spaced modes (i.e., separation in frequency between modes that is less than the SMTL-mechanical-resonator coupling strength $g_{em}$) of SMTL 12 in a manner similar to mechanically-induced sideband generation in cavity optomechanics, where a single cavity mode is parametrically coupled to a nano- or micromechanical resonator. With proper engineering of SMTL 12, two adjacent microwave modes are configured to have a frequency spacing that matches the frequency of mechanical resonator 16. Then, upon application of a microwave pump tone to the lower frequency SMTL mode, the anti-Stokes process, which drives the conversion of SMTL photons to mechanical resonator phonons (and vice versa), may be resonantly enhanced by the presence of the higher frequency mode. Because the efficiency of recently demonstrated optomechanical transducers is critically dependent on the strength of the anti-Stokes process, the use of the dual-mode scheme of the present invention may improve the optical-to-microwave transduction conversion efficiency and provide a viable route to quantum coherent transduction.

More specifically, the mechanical resonator 16 may comprise a suspended mechanical structure (e.g., membrane-style, cantilever, doubly-clamped beam, optomechanical crystal, microtoroid, or various other suspended geometries utilized for nanomechanical and micromechanical elements), or it may comprise surface and bulk acoustic waves launched from a piezoelectric transducer; either way, the mechanical resonator is coupled to SMTL 12 so that mechanical motion of mechanical resonator 16 stimulates sidebands on each of the modes of SMTL 12, as seen in FIG. 1B. With proper design, two adjacent SMTL modes will have a frequency spacing that matches the frequency of mechanical resonator 16, as seen in FIG. 1B. Upon application of a microwave pump tone $\omega_{Drive}$, the anti-Stokes process, which drives the conversion of SMTL photons to mechanical resonator phonons, will be resonantly enhanced by the presence of the higher frequency mode ($\omega_{Drive}+\omega_{NR}$). Because the efficiency of optomechanical transduction is dependent on the strength of the anti-Stokes process, the use of this scheme according to the present invention could greatly improve the conversion efficiency and provide a viable route to quantum coherent optomechanical transduction.

Figure 1C:
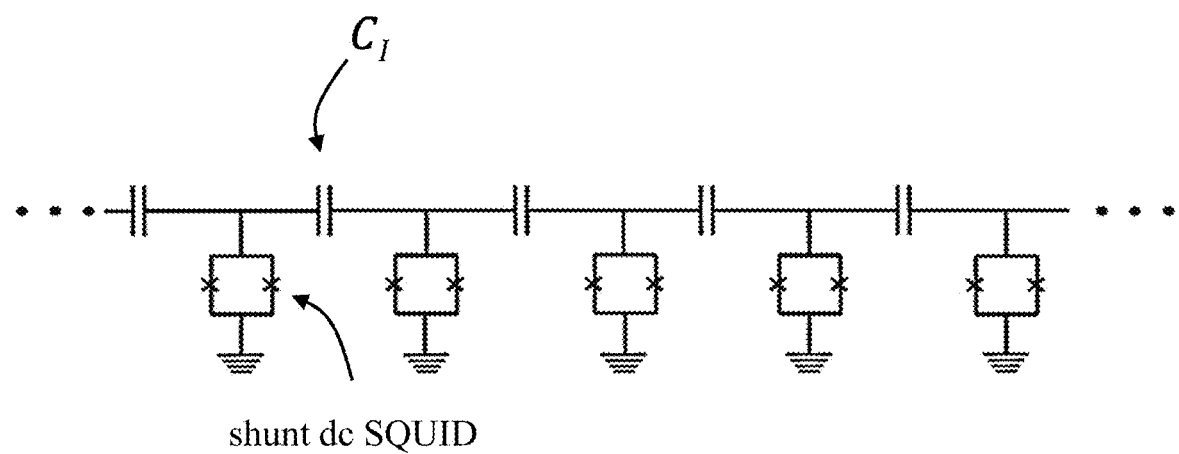
FIG. 1C is a diagram of the repeating unit cell for a tunable LHTL resonator according to the present invention, where the series capacitors $C_I$ and shunt dc SQUID (loop with two crosses representing Josephson junctions) variable inductor are the backbone of the LHTL, and the dc SQUID effective inductance is tuned by the applied dc flux Φ.

To achieve these conditions, a tunable SMTL structure 20 may be used, as seen in FIG. 1(c). FIG. 1(c) shows the repeating unit cell design for tunable SMTL structure 20. The series capacitors $C_I$ and shunt dc SQUID (loop with two crosses representing Josephson junctions) variable inductor are the backbone of the LHTL, and the dc SQUID effective inductance is tuned by the applied dc flux Φ.

Figure 2A:
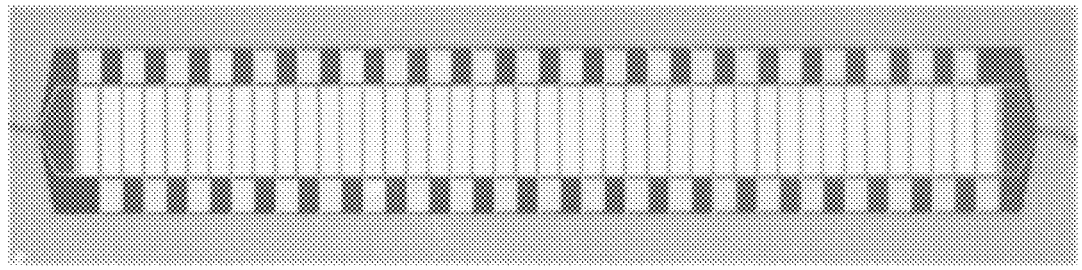
FIG. 2A is an image of a superconducting LHTL resonator according to the present invention that has been designed, measured, and characterized.

An additionally critical and novel aspect of this embodiment is the integration of a mechanical resonator (e.g., 2D membrane-based optomechanical crystal (OMC) 30 or other mechanical systems as enumerated in [0017]) with SMTL 12, as seen in FIG. 2, to serve both as both the physical element of mechanical resonator 16 and to provide transduction into the optical domain at single-photon levels. Mechanical coupling between optical and microwave photons has been shown by numerous groups. The effective Hamiltonian, in the interaction picture, can be described by:

$$\hat{H}=\hbar\omega_{cav}(a^\dagger a+\tfrac{1}{2})+\hbar\omega_m(b^\dagger b+\tfrac{1}{2})+\hbar g_{om}a^\dagger a(b+b^\dagger)+\hbar g_{em}(b^\dagger c+bc^\dagger)$$

where the first term is the energy in the optical cavity mode, with photon operators $a(a^\dagger)$, the second term is the energy in the microwave-frequency mechanical mode, with phonon operators $b(b^\dagger)$, the third term is the usual optomechanical interaction term with optomechanical interaction strength $g_{om}$, and the last term represents electrical actuation of the mechanical mode, using a Jaynes-Cummings interaction with coupling strength $g_{em}$ and an electrical driving field with operators $c(c^\dagger)$. The $g_{om}$ and $g_{em}$ may be optimized to ensure effective coupling between the SMTL and OMC-based mechanical resonator: the resonantly enhanced anti-Stokes process will be used to enhance $g_{em}$; the carefully engineered dispersion relation of the 2D optomechanical element will be utilized to optimize $g_{om}$ and match it to $g_{em}$ to maximize efficiency.

Figure 2B:
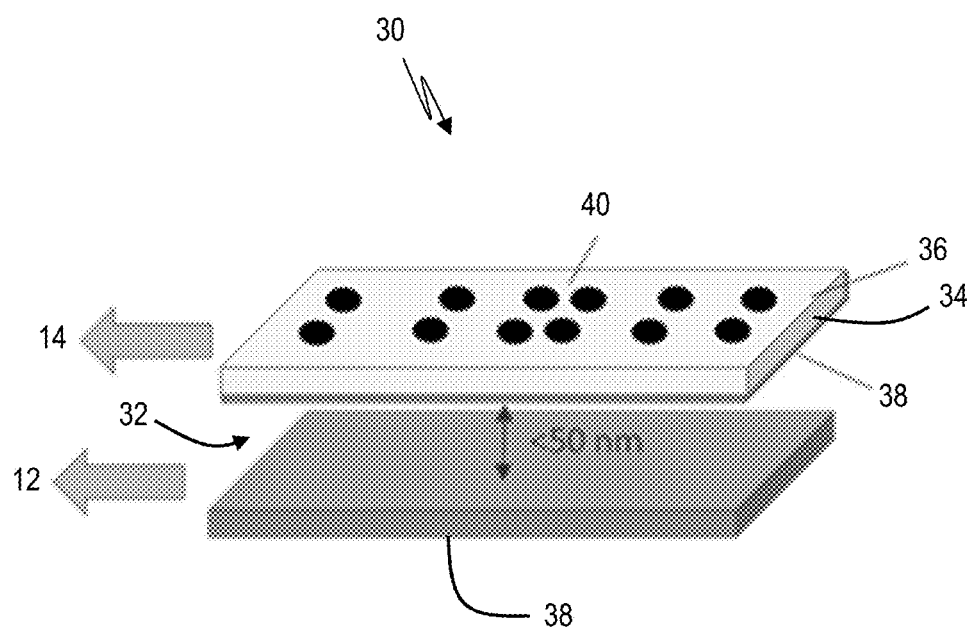
FIG. 2B is a schematic of a 2D NEMS structure for the OMC design according to the present invention.

As shown in FIG. 2B, 2D OMC membrane 30 (or any other mechanical system enumerated above) comprises a capacitor 32 having a top plate 34 formed from a top portion 36 formed from silicon and a bottom portion 38 formed from superconducting aluminum and connected to ground. The optical mode 40 is localized around defect near anti-node of displacement. Top plate 34 is coupled to photonic circuitry 14. The bottom plate 38 of capacitor is preferably formed from superconducting Nb and spaced apart from top plate 34. Bottom plate 38 is integrated with the cavity of SMTL 12 through either an electrostatic coupling, or evanescent wave coupling, either of which will be modified through the out-of-plane vibrations of the membrane. This will require either that the lower surface of the membrane 30 be metalized or that strong piezoelectric films (e.g. aluminum nitride, lithium niobate) be utilized for membrane 30. Technical approaches to both should be readily achievable using standard materials and fabrication techniques used in the community.

Figure 2C:
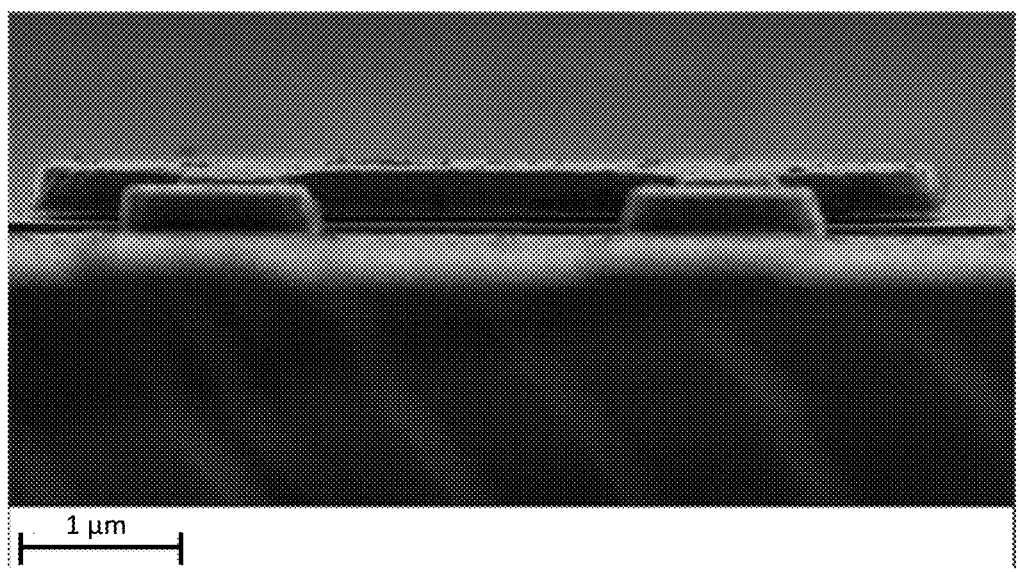
FIG. 2C is an image of a 2D NEMS structure according to the present invention.

FIG. 2C displays the particular flexural-plate geometry of an actual device that was produced and measured, and that has demonstrated strong (and tunable) electromechanical interactions. Moreover, this geometry is amenable to 3D integration techniques, which would enable additional design flexibility for achieving tight coupling. In addition, the structure could be patterned (as seen in FIG. 2B) with the requisite materials and nanofabrication techniques to realize a free-standing, 2D optomechanical crystal, which could facilitate a strain-mediated interaction between microwave circuitry and photonic circuitry.

A key feature of SMTL 12 is the tunability of high-modal-density resonances. This feature may be achieved through the use of superconducting quantum interference devices as the shunt inductors. However, the implementation may start with a simpler structure with a build-in of the complications one at a time to make sure that its behavior is understood and all parasitic effects are kept under control. FIG. 1(c) shows the unit cell design for the tunable SMTL resonator The design of the present invention may aim for an infrared cutoff frequency con $\omega_{IR} = \frac{1}{2}\sqrt{L_s C_f}$ on the order of 5 GHz, a typical qubit transition frequency and UHF mechanical resonance frequency. This can be accomplished with $C_f \sim 100\text{-}400$ fF and $L_S \sim 0.3\text{-}1$ nH. The dc SQUID inductance can be tuned over a broad range of values through application of a dc flux to the SQUID loop. If such a SQUID is incorporated into an LC-resonant circuit, one has tremendous control over the resonant frequency.

To date, high efficiency quantum microwave-optical interfaces remain an outstanding challenge to implement. The leading candidates—utilizing non-resonant anti-Stokes transduction—involve weak mode-mode interactions, which typically limit converter efficiency to $\eta \sim 10\%$, with $\eta = 47\%$ achieved using sophisticated signal processing of converter correlations. The resonantly-enhanced approach of the present invention should significantly boost inter-mode interactions and hence the converter efficiency. This can be understood by recognizing that $\eta \propto g_{em}^2$, for matched efficiency, where $g_{em} \propto \sqrt{N}$ is the coupling strength between the SMTL and the mechanical resonator, which determines the anti-Stokes scattering rate; and N is the SMTL photon number. Thus, a given incident pump power will yield a larger N, and hence larger $\eta$, for the case that the pump tone is resonant with the SMTL mode, compared to the conventional case where the pump is detuned from resonance.

What is claimed is:

1. A transducer, comprising:
    a metamaterial transmission line patterned from superconducting thin films and configured to produce a spectrum of modes in the microwave regime and having a mode spacing of 50 to 500 MHz, wherein the spectrum of modes has at least two adjacent modes with a predetermined frequency spacing; and
    a mechanical resonator coupled to the metamaterial transmission line, wherein the predetermined frequency spacing of the at least two adjacent modes of the metamaterial transmission line matches a frequency of the mechanical resonator.

2. The transducer of claim 1, wherein the mechanical resonator is parametrically coupled to the metamaterial transmission line so that any mechanical motion of the mechanical resonator will stimulate sidebands on each of the at least two adjacent modes of the metamaterial transmission line.

3. The transducer of claim 2, wherein application of a microwave pump tone to the lower frequency of the two adjacent modes of the metamaterial transmission line will resonantly enhance the anti-Stokes process with the higher frequency mode to drive conversion of any metamaterial transmission line photons into mechanical resonator phonons.

4. The transducer of claim 3, wherein the mechanical resonator is a membrane style mechanical resonator.

5. The transducer of claim 4, wherein the metamaterial transmission line is a tunable metamaterial transmission line.

6. The transducer of claim 5, wherein the tunable metamaterial transmission line comprises a series of unit cells.

7. The transducer of claim 6, wherein the series of unit cells comprise a capacitor and a variable inductor.

8. The transducer of claim 7, wherein the variable inductor comprises a shunt dc Superconducting Quantum Interference Device (SQUID) coupled to the capacitor.

9. The transducer of claim 1, wherein the resonator comprises an optomechanical crystal membrane.

10. The transducer of claim 9, wherein the optomechanical crystal membrane comprises a capacitor having a top plate having an upper portion and a bottom portion and a lower plate spaced apart from the bottom portion of the top plate.

11. The transducer of claim 10, wherein the upper portion of the top plate of the capacitor is formed from silicon.

12. The transducer of claim 11, wherein the bottom portion of the top plate of the capacitor is formed from superconducting aluminum.

13. The transducer of claim 11, wherein the bottom portion of the top plate is connected to ground.

14. The transducer of claim 13, wherein the bottom plate is formed from superconducting niobium.

15. The transducer of claim 14, wherein the bottom plate is coupled to a cavity formed from a metamaterial transmission line.

* * * * *